United States Patent
Moffett-Chaney et al.

(10) Patent No.: US 8,286,591 B2
(45) Date of Patent: Oct. 16, 2012

(54) ASSEMBLIES FOR ALLOWING PET ACCESS THROUGH A PANEL

(76) Inventors: Casey Moffett-Chaney, Portland, OR (US); Berdell Moffett-Chaney, Portland, OR (US); Corey Bruesch, Milwaukie, OR (US)

( * ) Notice: Subject to any disclaimer, the term of this patent is extended or adjusted under 35 U.S.C. 154(b) by 206 days.

(21) Appl. No.: 12/773,700

(22) Filed: May 4, 2010

(65) Prior Publication Data

US 2010/0282180 A1 Nov. 11, 2010

Related U.S. Application Data

(60) Provisional application No. 61/175,465, filed on May 5, 2009.

(51) Int. Cl.
*A01K 1/03* (2006.01)
(52) U.S. Cl. ............................ 119/501; 49/169; 119/484
(58) Field of Classification Search .......... 119/481–485, 119/501; 49/168, 169, 366, 367, 371, 380, 49/386, 394
See application file for complete search history.

(56) References Cited

U.S. PATENT DOCUMENTS

| | | | | |
|---|---|---|---|---|
| 3,654,733 A * | 4/1972 | Blackwell | ........................ | 49/168 |
| 3,918,203 A * | 11/1975 | Ellison, Jr. | ...................... | 49/168 |
| 4,053,007 A * | 10/1977 | Griffith | .......................... | 160/180 |
| 4,216,743 A * | 8/1980 | Cohen | ............................ | 119/484 |
| 4,224,899 A * | 9/1980 | Cruchelow et al. | ........... | 119/501 |
| 5,535,804 A * | 7/1996 | Guest | ............................. | 160/180 |
| 5,581,940 A * | 12/1996 | Peterson | ......................... | 49/169 |
| 5,649,500 A * | 7/1997 | Klavemann et al. | .......... | 119/452 |
| 5,701,813 A * | 12/1997 | Smith | ............................ | 160/180 |
| 6,029,609 A * | 2/2000 | Bahar et al. | ................... | 119/474 |
| 7,640,890 B1 * | 1/2010 | Maynard | ....................... | 119/484 |
| 2002/0144659 A1 * | 10/2002 | Sinor | ............................. | 119/484 |
| 2004/0194725 A1 * | 10/2004 | Ozeri et al. | .................... | 119/484 |
| 2005/0263091 A1 * | 12/2005 | Knapp | .......................... | 119/484 |

* cited by examiner

*Primary Examiner* — Rob Swiatek
*Assistant Examiner* — Ebony Evans

(57) ABSTRACT

Assemblies that allow pet access through a panel and enclosures having multiple functions. More specifically the enclosures include pet doors that allow for selective entry, whereby one or more designated animals are allowed to enter into the enclosures while other non-designated animals can be easily excluded, without owner supervision. The enclosures herein are useful for multiple purposes, non-exclusively including the isolation of pets so they can eat, eliminate waste, whelp, queen, nurse their young, or sleep without being bothered by other non-designated pets. Preferred embodiments are directed to barriers positioned near the pet door to deter other non-designated pets from interfering with the designated pets entering into the enclosures.

7 Claims, 22 Drawing Sheets

FIG. 4-A
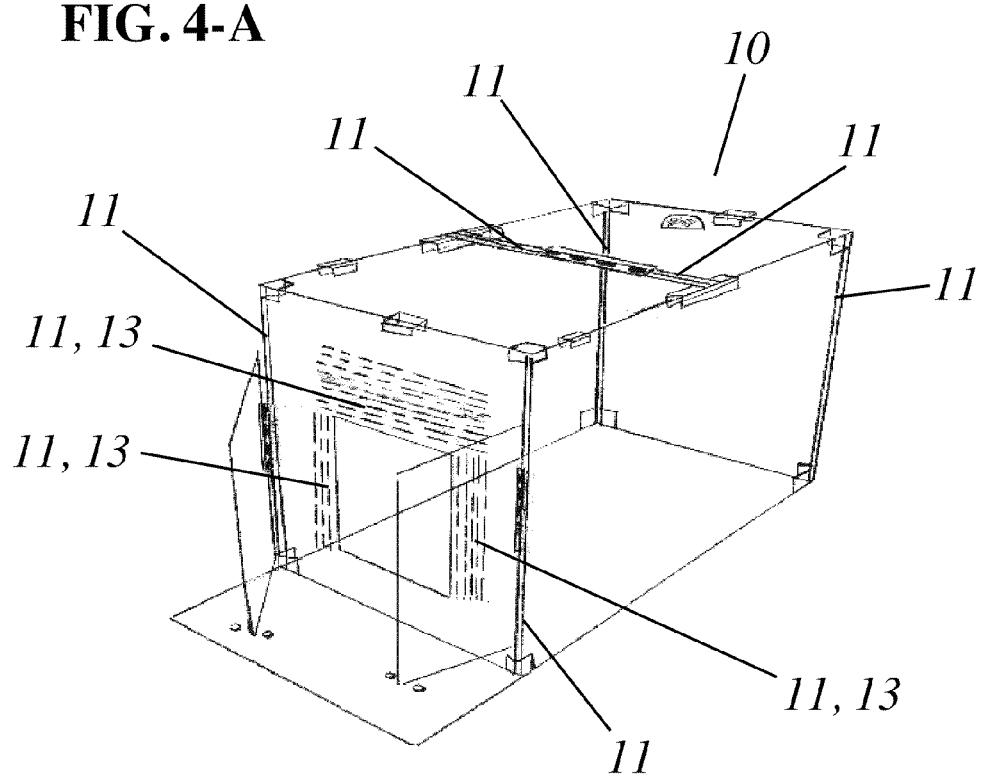
FIG. 4-B
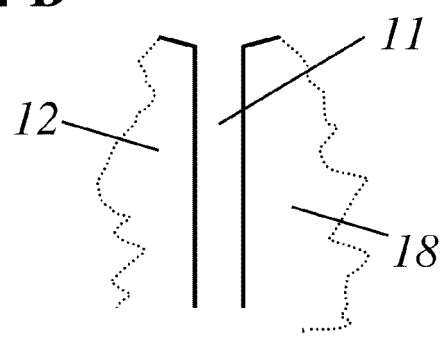

FIG. 8-A
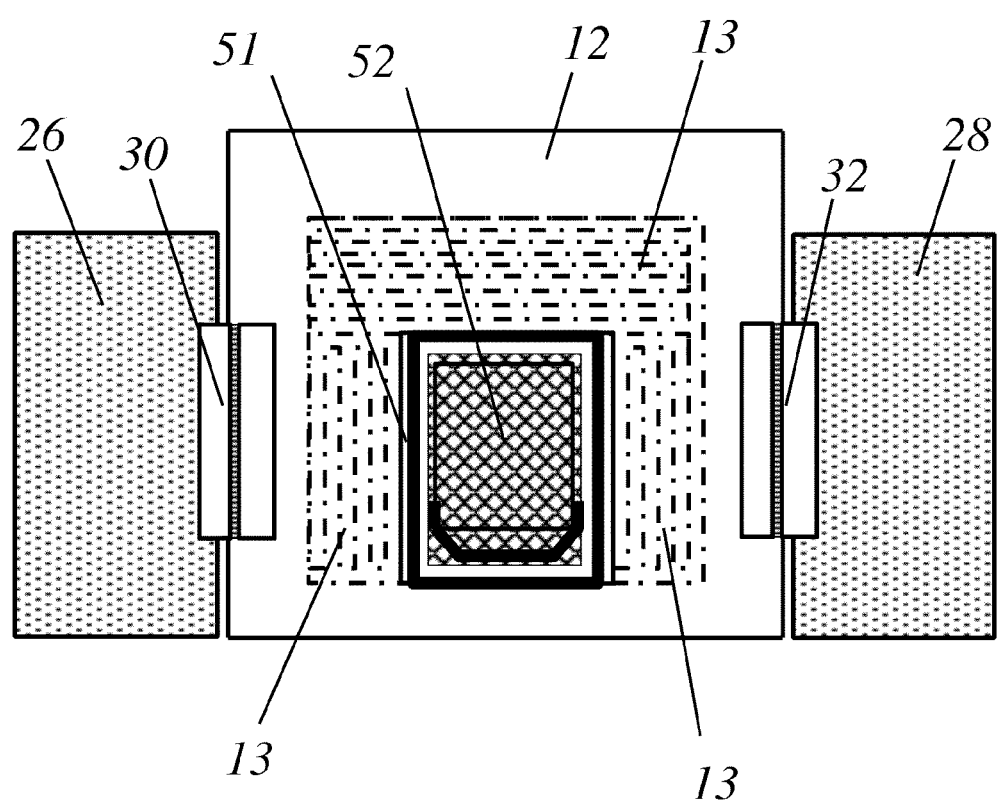

FIG. 8-B
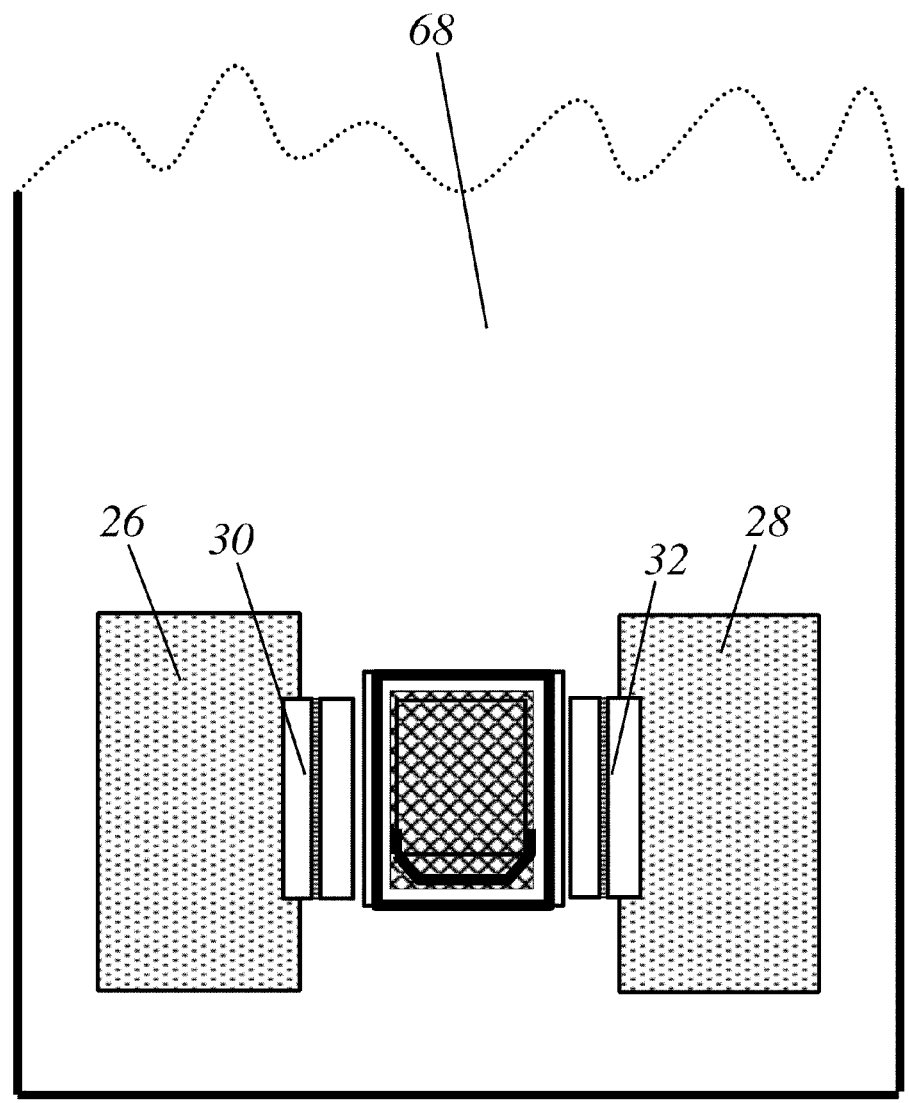

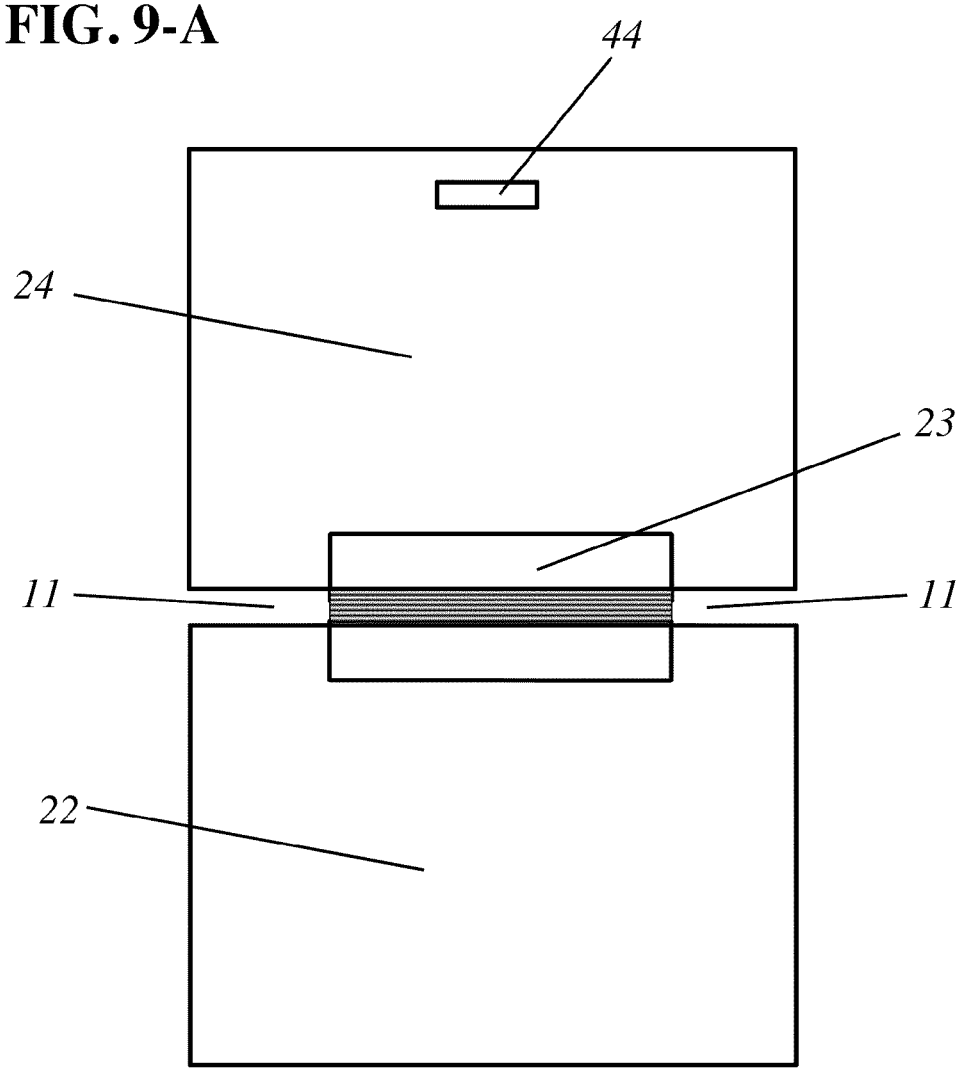
FIG. 9-A

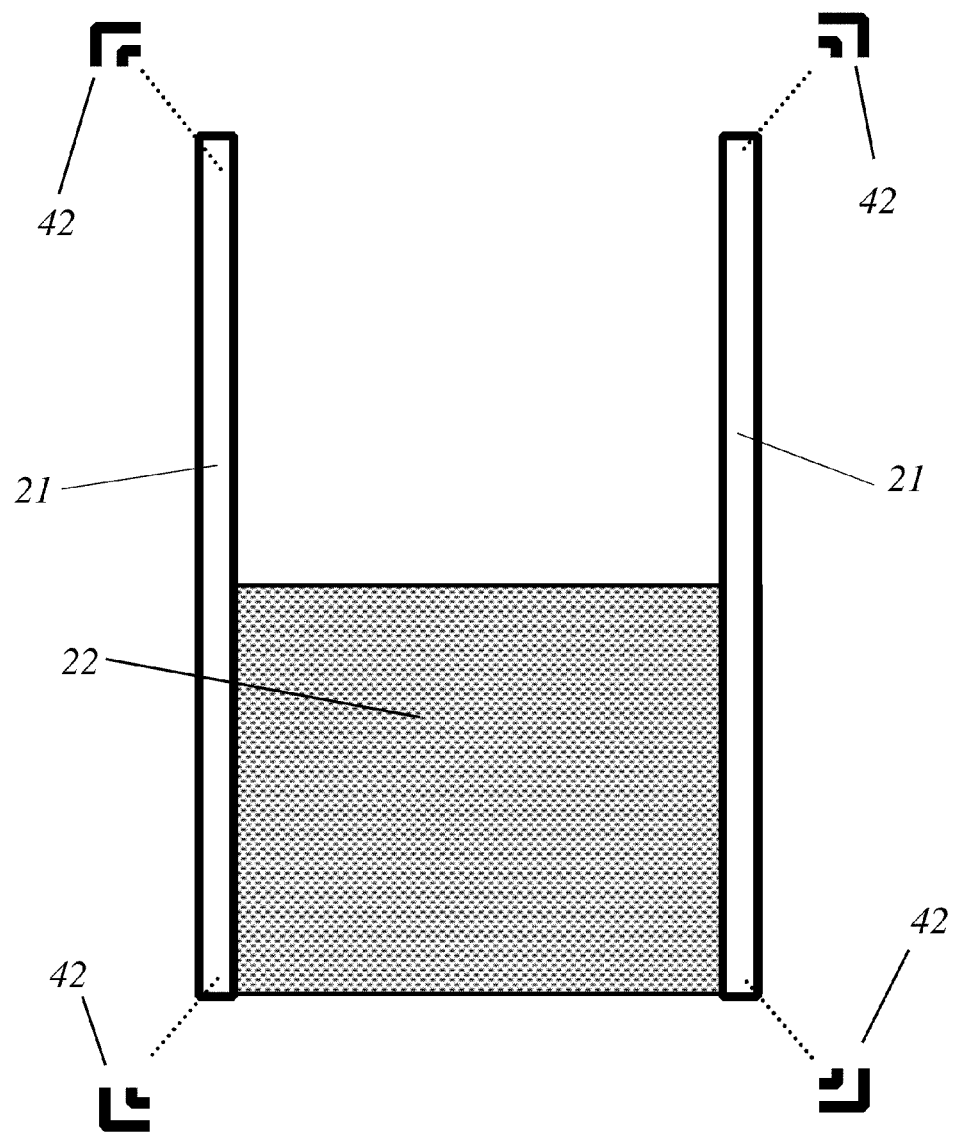

FIG. 9-C
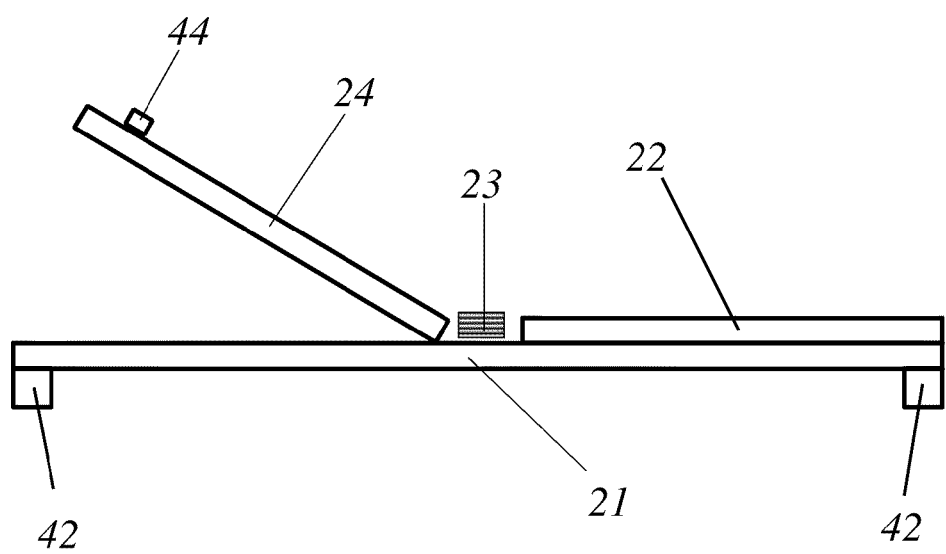

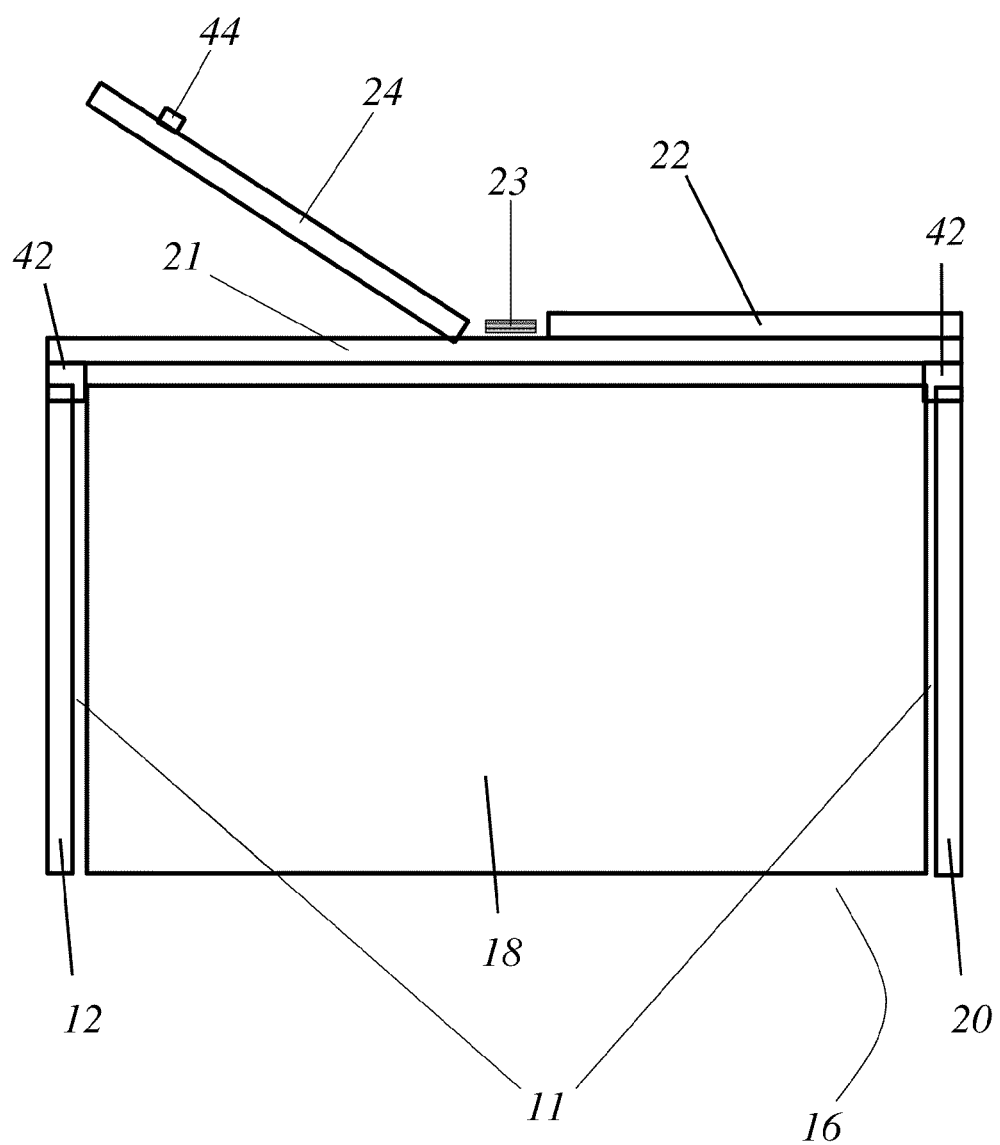
FIG. 9-D

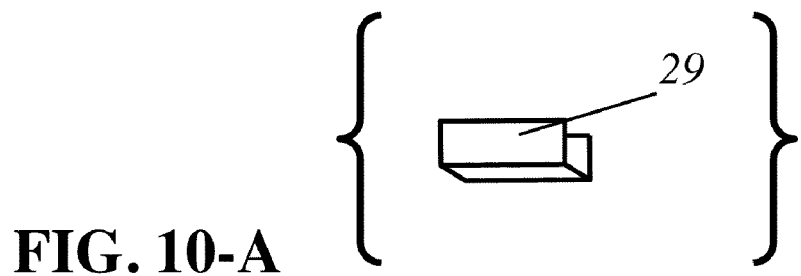
FIG. 10-A
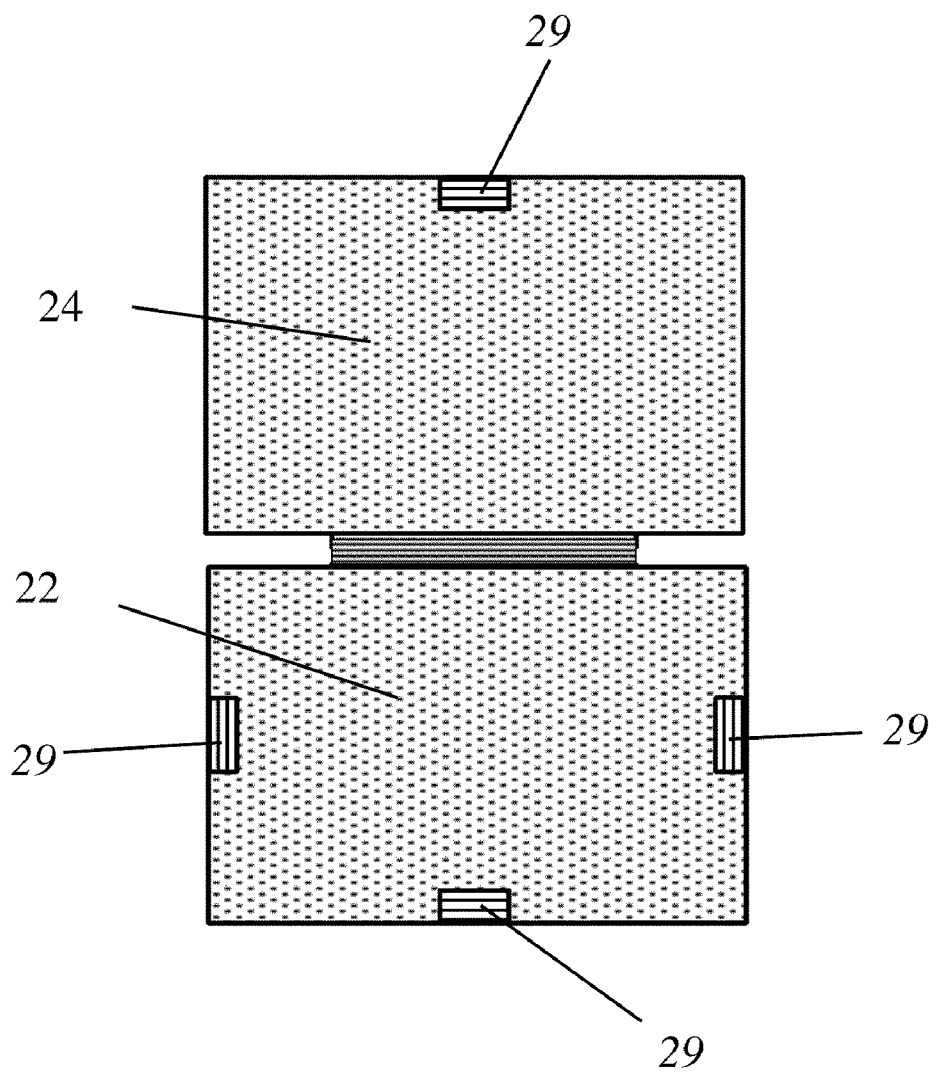

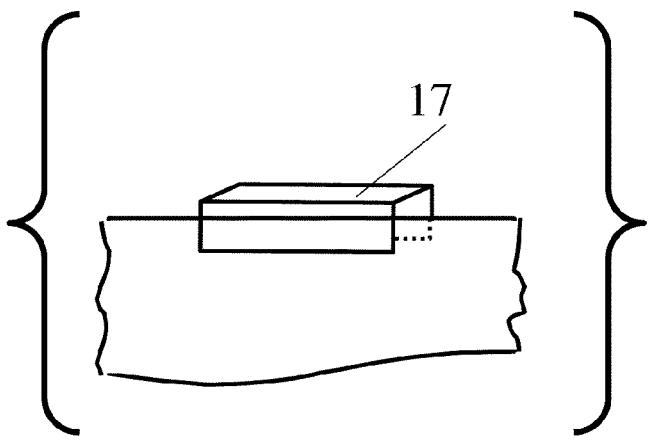
FIG. 10-B
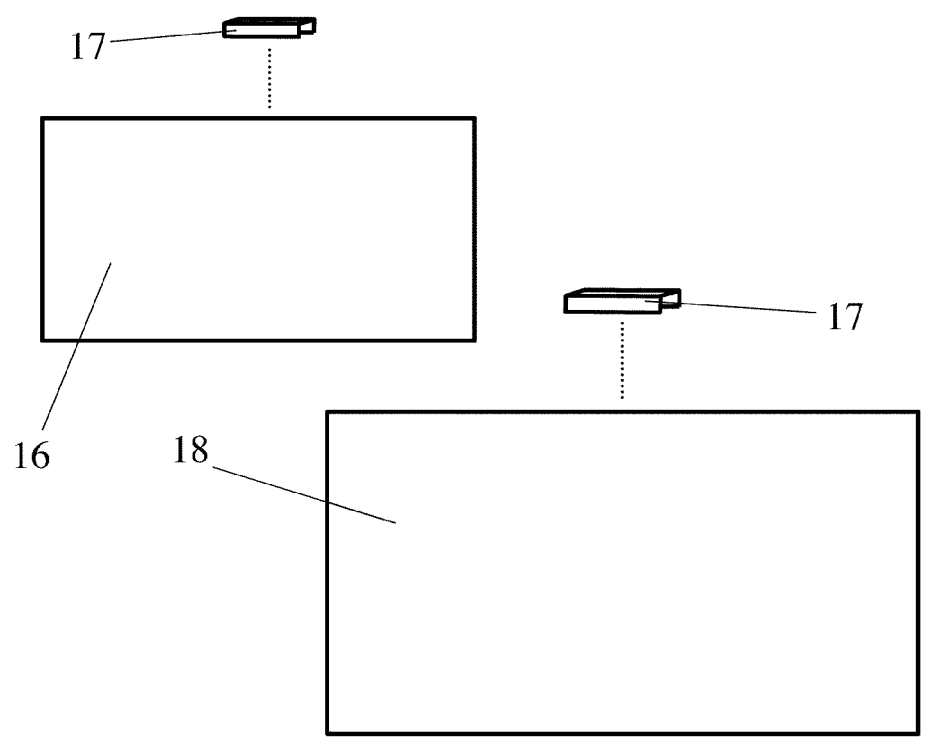

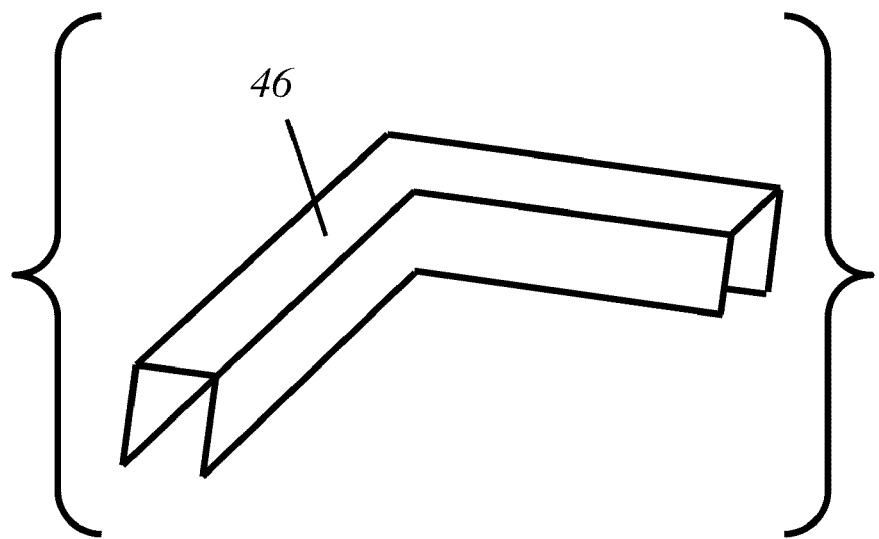
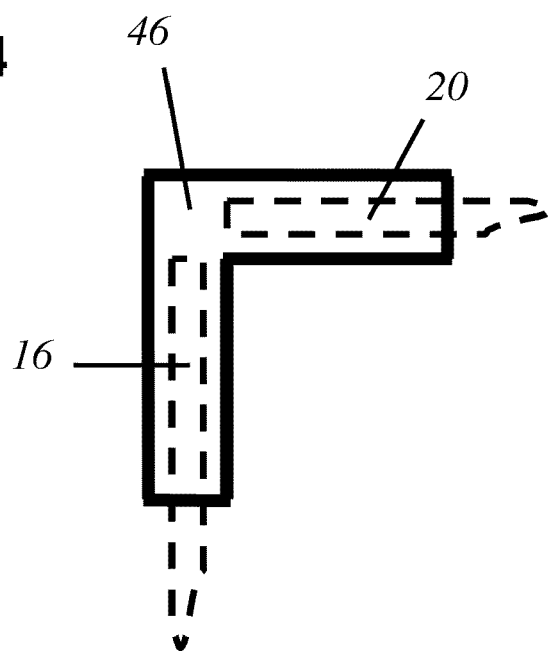
FIG. 14

ASSEMBLIES FOR ALLOWING PET ACCESS THROUGH A PANEL

CROSS-REFERENCE TO RELATED APPLICATIONS

This application claims priority to U.S. Provisional Application Ser. No. 61/175,465, filed May 5, 2009, which is expressly incorporated herein by reference in its entirety.

BACKGROUND

When a household has multiple pets, there are issues that arise compelling a system be found for creating a space that is accessible to one or some of the animals and restricted to others. Among those issues are food management, health management, litter control, privacy and safety, whelping and queening.

Concerning feeding arrangements, imagine, for example, a household with two cats, one of which eats small amounts all day, the other of which compulsively eats all of its food in one meal. Or two dogs with the same issue. The pet that grazes throughout the day eats a bit of its food and walks away. The other pet eats all of its own food, then bullies the other pet away from its food, and quickly devours the other pet's food. Another example scenario exists where one of two animals is, for instance, diabetic, and should not be eating the other pet's food. Still another example of feeding concerns applies when there is a dog in the house that will eat a cat's food. Solutions include keeping the pets in separate rooms all day, or constant vigilance and administration by the pet caretaker, or, in the case of the dog, placing the cat's food bowl on the kitchen counter, or on the roof of the house, or in a room that remains closed to the dog. None of these solutions is desirable. Pet caretakers must exert and expend worry, concern and ongoing negative energy, as well as physical and mental energy that could best be used loving and enjoying their pets. A way for an animal to have its own food, and in its own space, accessible to them, free from a caretaker's constant vigilance, and without creating antagonistic circumstances for the pet and its caretakers, would be desirable.

Litter control is another concern for cat owners. For cat owners who also own a dog, keeping the dog out of the cat's litter can be another big problem. Dogs ingesting cat feces get sick and make a mess in a home and cost pet caretakers money, time and energy. In addition, many cats will refuse to use a litter box that has been besieged by another animal. A way to keep cat litter separate from a dog without having to put the cat litter somewhere inconvenient would be desirable.

Privacy is often an issue in multi-pet households. Many vases have been broken due to territorial altercations, and cats appreciate closed, private areas where other animals cannot invade the space. Kitchen cupboards and clothes dryers are poor choices because objects are ruined and animals are harmed or lose their lives. Pet caretakers must be in constant vigilance and carefulness. Cats, and many dogs, have strong needs for a sense of privacy and safety. A cozy, private environment of their own would lessen unsafe and destructive territorial problems.

Whelping dogs or queening cats could use a space of their own other than inappropriate settings, such as the family closet, a chest of drawers, or under a family member's bed, for giving birth and nurturing their young. The odor left in a bedroom and on clothing and linens is highly disconcerting and objectionable. An enclosure set up for birthing pets that only the pet and pet caretakers could access would be clean, beneficial and desirable to both pets and humans.

An enclosure, accessible only to selected animals, would solve most of the challenges above, as well as many others. A device that included an enclosure large enough for an animal to enter completely, small enough to place inside a home, and be accessible by selected pets for shelter, retreat, feeding, and litter use would be an expedient solution. Said enclosure would need to meet measurement requirements for specific types of pet actuated selected access systems, since the ability to access the enclosure usually depends upon a device attached to a collar of an allowed animal, and a door to be accessed. Said enclosure would also need a system of barriers for disallowing non-selected animals from entering when selected animals have activated access, either upon entry or exit.

While there are various pet actuated systems, most prior art disclose devices specifically for feeding, and most of them lack an actual enclosure to be accessed by an animal using a system of restricted or selected access. Few, if any, offer an enclosure that could meet a multiplicity of the needs described above, nor do the enclosures offer the flexibility of choice concerning the kind of selective access system desired. None of them offer a barrier system for keeping non-allowed animals from bullying tactics that would allow them to enter said enclosure, nor do they offer a barrier system that will make a non-allowed animal incapable of entering said enclosure.

One example of animal actuated entry with a quasi-enclosure is taught by U.S. Pat. No. 7,458,336 filed May 7, 2005 titled ANIMAL IDENTIFICATION AND ENTRY CONTROL SYSTEM FOR FEEDING PURPOSES. It discloses a pet actuated entry using a radio frequency identification device (RFID) system and includes an animal collar-mounted RFID tag. The entryway only allows a portion of one animal, the head, to enter. Clearly, this enclosure is for feeding purposes only, and could not be used for any other purposes described above. Additionally, there is only one choice of entry system, and that is the RFID system built into the enclosure, which is the main focus of the claims. The barrier system on this is described as a "bevel" which would keep another animal from being able to force its head into the eating chamber alongside an allowed animal, but the design of the enclosure, coupled with the bevel, does not prevent a non-allowed animal from bullying an allowed animal away from the entry, nor would it keep a non-allowed animal from quickly bullying and pushing its way into the enclosure when the door is opened electronically, via RFID, by an allowed animal.

There are litter enclosures, few of which offer selected access. One such litter enclosure, taught by U.S. Pat. No. 5,975,017 titled EXTERIOR MOUNTED HOUSING FOR ANIMAL LITTER BOX filed Dec. 16, 1997, discloses a housing for the litter mounted on the exterior side of a dwelling with a tunnel that interconnects the interior of the dwelling with the exterior. Though this may prevent a larger dog from accessing the litter, a small dog would trot through the tunnel as easily as a cat. There is no system for selective access, or a system of barriers for non-allowed animals.

An enclosure for safety, comfort, and whelping is disclosed by U.S. Pat. No. 5,551,371 titled PET ENCLOSURE FOR HOUSING A PET ENABLING PASSING IN AND OUT OF THE ENCLOSURE, filed Jan. 18, 1994, does not include a means for selective access, nor a barrier system.

A multi-use pet enclosure U.S. Pat. No. 6,513,456 titled MULTI-USE PET ENVIRONMENT filed Jan. 30, 2001, discloses a multi-use enclosure without the benefit of a rough-in access for neither a selective access pet door system nor a barrier to restrict other animals from entry.

While these units all solve similar pet problems, they do not address a plurality of issues, nor offer the ability of the pet caretaker to choose selective access systems that could be adapted and upgraded to address changing pet ownership needs. Thus, they would not be as suitable to the needs of multi-pet households as the invention disclosed hereafter.

SUMMARY

Disclosed is an assembly for allowing pet access through a panel comprising: a front panel separating an external environment from an internal environment; a pivotal pet door positioned within the front panel and configured to allow the passage of a first pet through said pet door and front panel; and first and second barriers, having proximal ends coupled to the front panel, flanking the sides of the pet door, and configured to be positioned at angles of less than 90 degrees with respect to the pet door, such that distal ends of the first and second barriers define a gap having a width that allows the first pet to pass through towards the pet door while excluding the simultaneous passage of a second pet.

Also disclosed is an assembly for allowing pet access through a panel comprising: a front panel separating an external environment from an internal environment; a webbing area positioned within the front panel and configured to be readily cut to accommodate the installation of a single pet door selected from a group of differently sized pet doors; and first and second barriers, having proximal ends coupled to the front panel, flanking the sides of the webbing area, and configured to be positioned at angles of less than 90 degrees with respect to the webbing area, such that distal ends of the first and second barriers define a gap sized to allow the first pet to pass through towards the webbing area while excluding the simultaneous passage of a second pet.

Also disclosed is a multi-function pet enclosure with an adaptable rough-in access ready for the installation of one of a plurality of pet actuated selective access systems, and includes a barrier system for ensuring access only to selected animals. The disclosed enclosure is made from clear acrylic plastic, sized to hold a selected animal, and discloses a set of barriers for preventing access to other animals while one pet is entering or exiting, and the rough-in includes webbing surrounding the enclosure opening for the purpose of easily adapting the size of an opening during installation of pet actuated pet doors. Also disclosed is a system of ventilation, a system of human access for set-up and cleaning of the interior, and a system of simple disassembly and re-assembly.

Also disclosed in this embodiment is the Catwalk Multi-Magnetic Cat Flap # W-MCDW, a pet actuated selective access gate system, manufactured by Pet-Tek, International LTD, which is installed into the disclosed pet enclosure for the purposes of selected access entry; and a magnet to be placed on the collar of a pet allowing it to open the gate and have access to the inside of the disclosed enclosure.

It is an object of the disclosed enclosure and gate to create a system for the purposes of animal control. The enclosure, combined with the gate, will allow animal caretakers the ability to better administer and manage the well-being of an animal or animals by empowering certain animals to enter said enclosure, while preventing other animals from entering said enclosure. The enclosure, in conjunction with the gate, will free pet caretakers from time intensive efforts to control animal behavior because there will be no need for human control. The enclosure, combined with the gate is its own control. The resulting benefits of the enclosure, combined with the gate, will also create an environment for pets where they will experience less anger and frustration from their caretakers.

It is an object of the disclosed enclosure to create a pet enclosure with a rough-in access for pet actuated entry doors. The enclosure will allow one of assorted pet actuated access doors to be installed in the rough-in. The enclosure will allow a user to choose a pet actuated entry door system from products available worldwide, including but not limited to magnetic, electronic, radio frequency, and infrared pet actuated entry systems. The enclosure will also allow the user to create, build and install their own pet actuated entry door/system into the rough-in of the enclosure.

It is further an object of the disclosed enclosure to create a pet enclosure entry rough-in that is adaptable for receiving any one of various-sized and various-shaped pet actuated entry doors.

It is still further an object of the disclosed enclosure to create a pet enclosure with an adaptable rough-in entry that is easy and convenient to adapt the size of the entry opening. The rough-in will allow a user to swiftly and simply adapt the opening to install a pet actuated access door by snipping away webbing created around a minimum sized aperture using, but not limited to, ordinary pliers.

It is a further object of the disclosed enclosure to prevent an animal from entering the enclosure while another animal is entering or exiting by means of barrier panels placed on either side of the pet actuated door. The enclosure's barrier panels will also disallow an animal from holding the flap of the door open while another animal is entering or exiting. Said barrier panels may also be applied and used in conjunction with various selective access systems used for special access situations not necessarily involving an enclosure system like the one disclosed here.

It is still another object of the disclosed enclosure to be easy to clean and change food, bedding, and other items, which may require the pet caretaker simple access. The inside of the enclosure can be accessed by lifting the Top Back Panel using the attached handle, and flipping it back on its hinge, and closing it again when finished. In addition, the Top Forward Panel can be opened in the same manner, for dual side access.

It is further an object of the disclosed enclosure that assembly be simple and quick. The enclosure will be completely ready for assembly, and readied for installation of a pet actuated access door without the need of tools. In addition, the enclosure can be dismantled and re-assembled for cleaning or moving, without tools.

It is further an object of the disclosed enclosure to provide a system of ventilation within the enclosure. The enclosure will be ventilated by means of a system of webbing around the rough opening, and by a design of the enclosure that allows free flowing ventilation through the corners, top, and edges of the enclosure.

It is an object of the disclosed enclosure, in conjunction with a pet actuated entry system and barrier system, to provide a method of animal control that solves various challenges found in multi-pet environments. The enclosure with an installed pet actuated entry system provides a method of feeding animals in multi-pet environments that will prevent them from eating each other's food, thereby preventing pet health problems, and altercations with one another due to food issues. The enclosure, in conjunction with a pet actuated entry system, creates a safer environment for multiple-pet households by preventing these altercations and illnesses. The enclosure, in conjunction with a pet actuated entry system, will also prevent stray and/or wild animals from taking the food and water of a pet that is kept outdoors. The enclosure, in conjunction with a pet actuated entry system, will provide a safe, secure, and appropriate space for birthing and lactating cats or small dogs. The enclosure, in conjunction with a pet actuated entry system, will also deter birthing and lactating cats and dogs from creating birthing space in undesirable areas, such as in a pet owner's chest of drawers, under the pet owner's bed, or inside a pet owner's closet. The enclosure, in conjunction with a pet actuated entry system, will provide a method of housing a cat litter box that will be inaccessible to, for example, a dog that is prone to eating cat feces. The enclosure, in conjunction with a pet actuated entry system, will also reduce a possibility of said dog becoming soiled and/or ill due to digging and consuming cat litter and cat feces by denying them access to it. The enclosure, in conjunction with a pet actuated entry system, will provide a haven for an animal in fear, or for an animal that prefers solitude by denying access to other animals. The enclosure will also function as an indoor cat or dog house. The enclosure, in conjunction with a pet actuated entry system, will also protect one animal from another.

BRIEF DESCRIPTION OF THE DRAWINGS

It will be appreciated that the drawings are not necessarily to scale, with emphasis instead being placed on illustrating the various aspects and features of embodiments of the invention, in which:

FIG. 4-A: A perspective view of the Pet Enclosure emphasizing and focusing on the Ventilation system. Note that Webbing 13 also doubles as part of Ventilation system 11. Each gap between wall panels and front and back panels runs from the top corner to the base panel. The 2-way clips attached to the base panel actualize the gap.

FIG. 4-B: A magnified section view of one area of the Ventilation system from where the Front Door Panel and Right Side Wall Panel meet at the top corner.

FIG. 8-A: A plan view of the Front Door Panel, illustrating the inclusion of a pet access door with barriers installed within the rough-in.

FIG. 8-B: A plan view of a pet access door with barriers installed within a human door.

FIG. 9-A: A plan view of the Top Panels, with attached Piano Hinge and Handle.

FIG. 9-B: A plan view of the underside of the Top Rear Panel showing the attached Stabilizers and placement of the Two-Way Clips.

FIG. 9-C: A side view of the preferred embodiment of the Enclosure Lid, showing the Top Forward Panel in a slightly open position.

FIG. 9-D: FIG. 9-C attached to the wall panels of the Enclosure.

FIG. 10-A: A plan view of the underside of the Top Panels which are connected by the attached Piano Hinge, showing the placement and attachment of the U-Bars, plus a magnified view of the U-Bar, U-side up.

FIG. 10-B: A perspective view of the Left and Right Side Wall Panels, showing the placement of the U-Bars, plus a magnification of the U-Bar, U-side down with the U straddling an edge of a Side Wall Panel.

FIG. 14: A section view of an Angle Iron Cap covering and connecting the top corners of the Side Wall Panels to the Back and Front Panels, plus a magnified view of an Angle Iron Cap.

DETAILED DESCRIPTION OF THE ILLUSTRATED EMBODIMENTS

Embodiments of the present invention are described below. It is, however, expressly noted that the present invention is not limited to these embodiments, but rather the intention is that modifications that are apparent to the person skilled in the art and equivalents thereof are also included.

The invention relates to a multi-functional pet enclosure with an adaptable rough-in portal for installing assorted pet actuated entry systems. More specifically the invention relates to an adaptable rough-in entry for pet actuated entry doors, to a system of webbing around the rough-in for purposes of easy size adaptation and natural ventilation, to an enclosure intended for use by a domesticated pet, to a system of easy assembly and dis-assembly, to a system of ventilation, and to barrier panels to aid in restricting access to other animals for purposes relating to a need for selective access.

Figure 1:
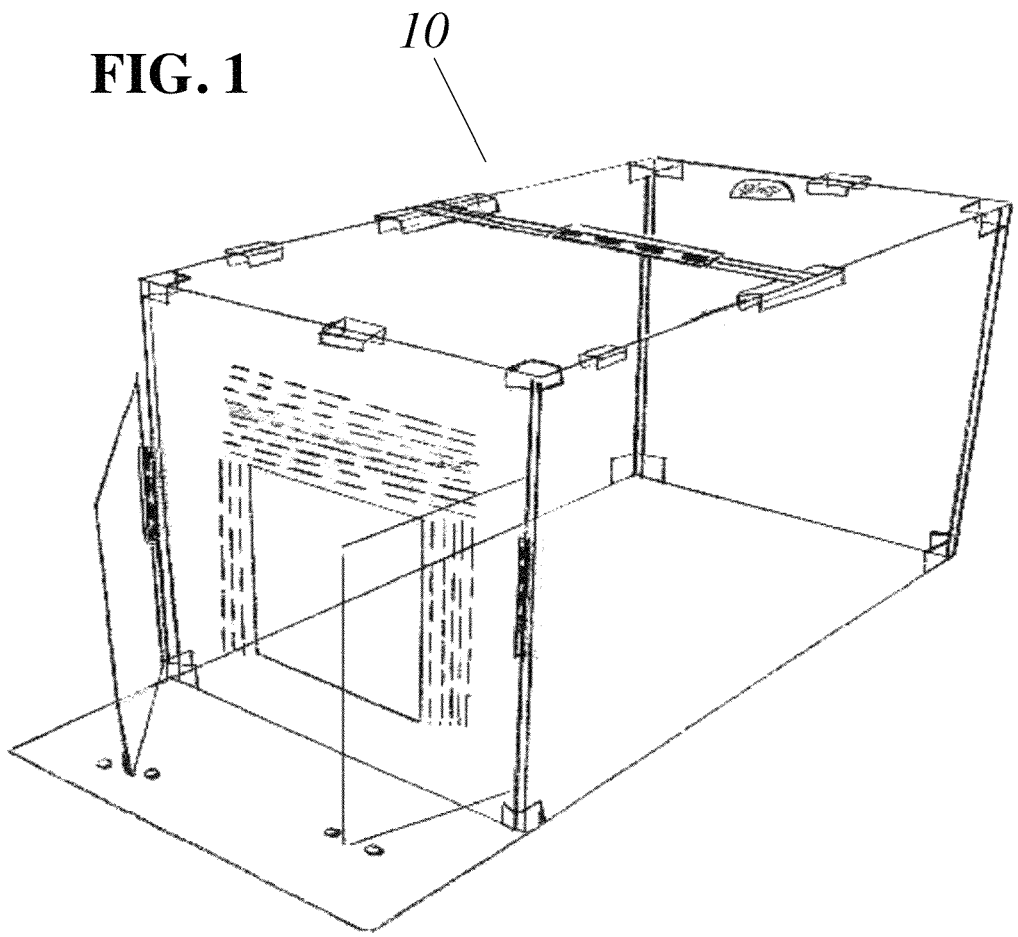
FIG. 1: A perspective view of the Pet Enclosure.
Figure 2:
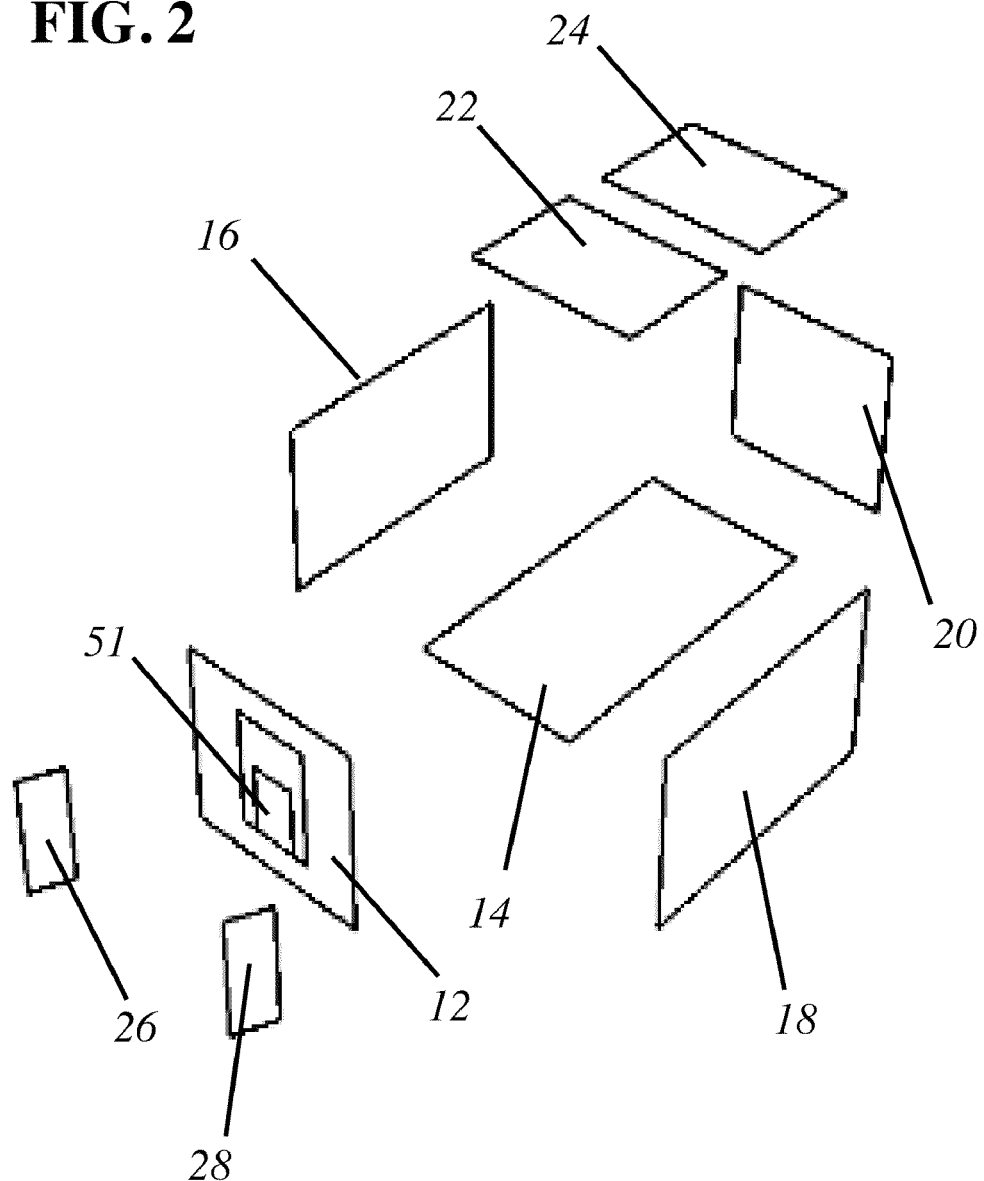
FIG. 2: An exploded perspective view of the main panels.

FIG. 1 discloses a multi-function Pet Enclosure 10. This present enclosure is made from plastic parts, and, when gluing is indicated within the Detailed Description, the adhesive is acrylic plastic glue. The Pet Enclosure 10 comprises acrylic plastic panels, including FIG. 2 a rectangular Base Panel 14, a rectangular Left Side Wall Panel 16, a rectangular Right Side Wall Panel 18, a substantially rectangular Back Wall Panel 20, a substantially rectangular front door panel 12 with an adaptable Rough-in Access 51 ready for the installation of one of a plurality of pet actuated selective access systems, a Top Rear Panel 24 and Top Forward Panel 22, a rectangular Left Barrier 26, and a rectangular Right Barrier 28.

Figure 3:
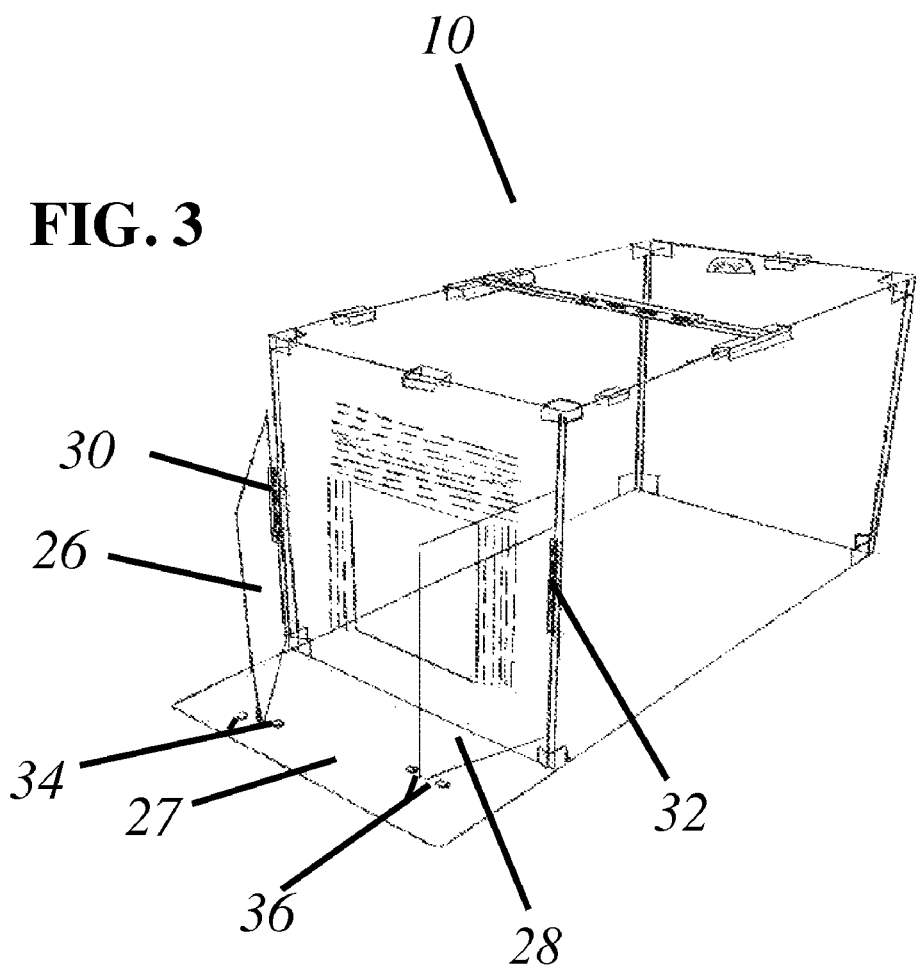
FIG. 3: A perspective view of the Pet Enclosure emphasizing and focusing on the Barrier system.

FIG. 3 illustrates Pet Enclosure 10 with focus on the Barrier system located at the front of Pet Enclosure 10, comprising Left Barrier Panel 26, Right Barrier Panel 28, Porch 27, Left Piano Hinge 30, Right Piano Hinge 32, Left Bumpons 34, and Right Bumpons 36.

FIG. 4-A discloses Pet Enclosure 10, with focus on the Ventilation System 11, comprised of numerous and miscellaneous openings created by the structural design and parts used in the construction and assembly of Pet Enclosure 10. Webbing 13 has dual use in this illustration, so is assigned both numbers 11 and 13. FIG. 4-B shows a magnified example of one aspect of the Ventilation System 11, by means of the gap created once Front Door Panel 12 and Right Side Panel 18 are assembled.

Figure 5:
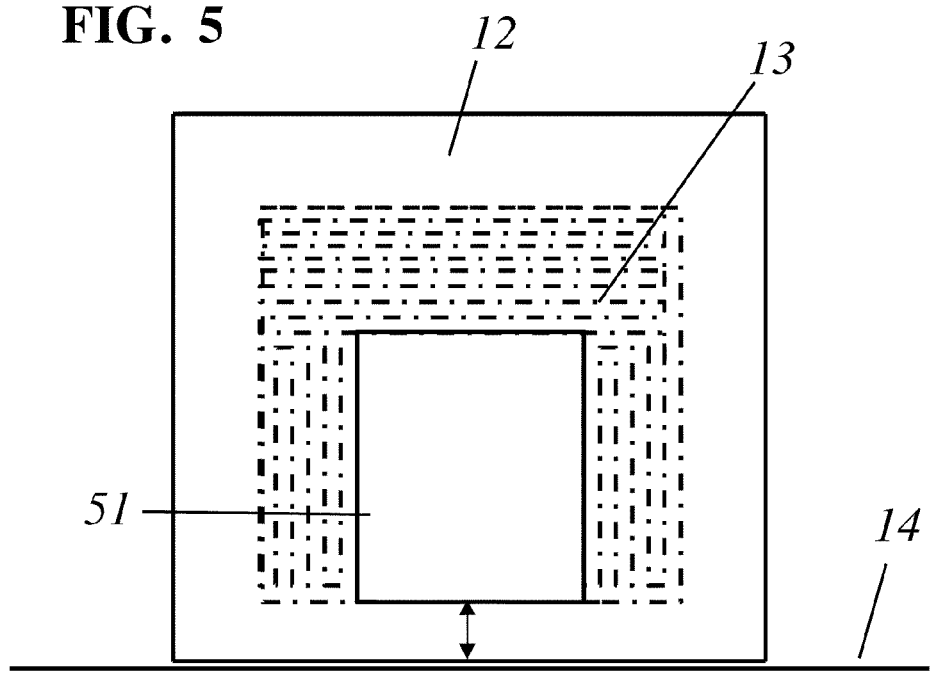
FIG. 5: A plan view of the Front Door Panel showing the Webbing around the Rough-in Access, and the distance that exists from the bottom of the Rough-in Access to the Base, for a purpose of installing a pet access door.

FIG. 5 discloses Front Door Panel 12 after the Webbing 13 and Rough-in Access 51 has been created. In this preferred embodiment, a router with an end mill bit was used to create rows of long and short dashes (the Webbing 13) as shown, to weaken the plastic around the Rough-in Access 51 to make the size adaptation easy for the installation of any pet access door chosen by an end user of the disclosed enclosure. The Webbing 13 rows are ⅛" apart from one another. The router and end mill create Rough-in Access 51 after the Webbing 13 is completed. In a preferred embodiment, the bottom of Rough-in Access 51 can advantageously begin at 2.5" above the Base Panel 14 or flooring surface in order for a pet actuated access door to work properly, so there is no Webbing 13 below the Rough-in Access 51. The Front Door Panel 12 can be sold with the Webbing 13 alone such that the user can cut out the Rough-in Access 51. Alternatively, the Front Door Panel 12 the can be sold with the Rough-in Access 51 already cut into the Webbing 13, such that the user can enlarge the Rough-in Access by cutting the Webbing 13.

Figure 6:
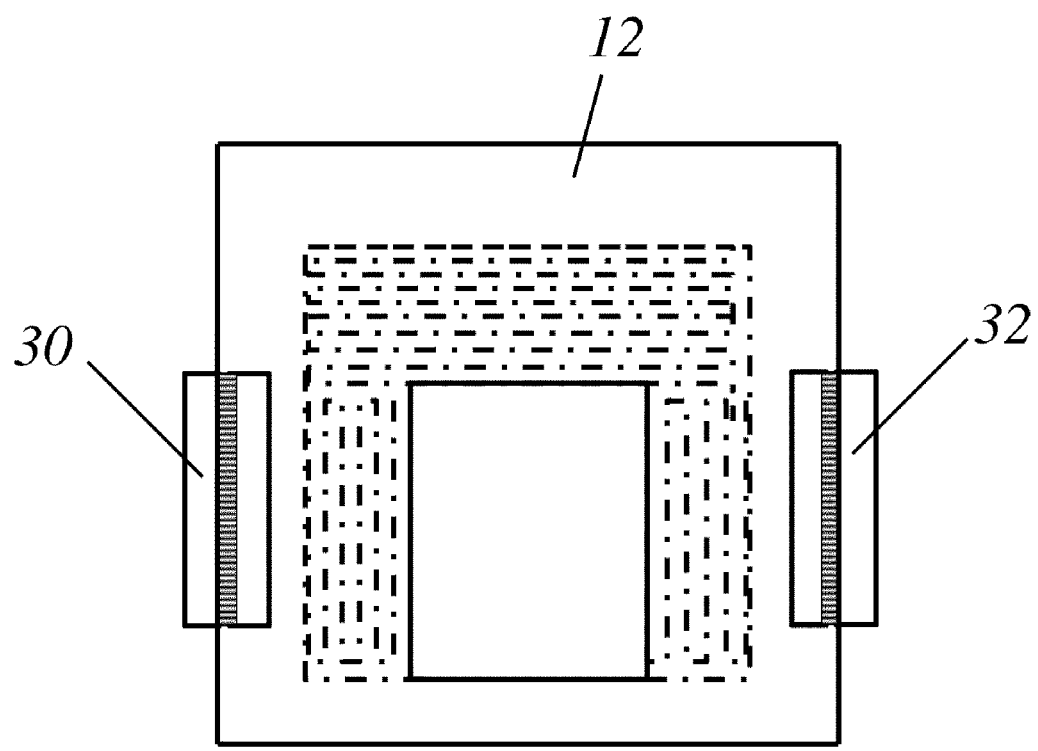
FIG. 6: A plan view of the Front Door Panel with the Piano Hinges attached.

FIG. 6 depicts the attachment of Left Piano Hinge 30 and Right Piano Hinge 32 onto the left and right edges of Front Door Panel 12. One half of both Piano Hinges 30 and 32 are glued to Front Door Panel 12 as shown, with the other halves left in the open position.

Figure 7:
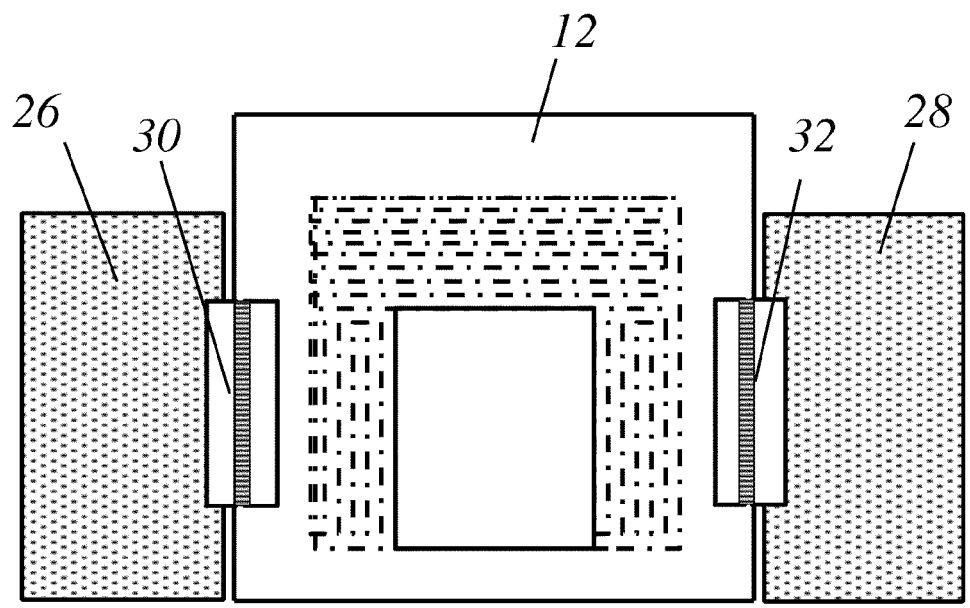
FIG. 7: A plan view of the Front Door Panel with the Barriers attached to the Piano Hinges.

FIG. 7 discloses the attachment by glue of Left Barrier Panel 26 to Left Piano Hinge 30, and Right Barrier Panel 28 to Right Piano Hinge 32, located on Front Door Panel 12. Both Barrier Panels 26 and 28 swing forward and can lie flat on the face of Front Door Panel 12 until ready for use.

FIG. 8-A portrays the entire Front Door Panel 12 assembly, comprised of Front Door Panel 12, Webbing 13, Rough-in Access 51, Piano Hinges 30 and 32, Barrier Panels 26 and 28, and in this drawing, a Selective Access Pet Door 52.

FIG. 8-B: portrays a Selective Access Pet Door 52, Piano Hinges 30 and 32, and Barrier Panels 26 and 28, installed within a human door 68.

FIG. 9-A displays Top Rear Panel 24 and Top Forward Panel 22 connected to one another by gluing Top Piano Hinge 23 to the inside center edge of Top Rear Panel 24 and Top Forward Panel 22 as shown. A Ventilation System 11 is created between the top panels. Handle 44 is glued as shown, close to the outer center edge of Top Rear Panel 24. Top Rear Panel 24 lifts using Handle 44 and can hinge all of the way back so that Top Rear Panel 24 lies horizontal with Top Forward Panel 22 allowing a user top access into FIG. 1 Pet Enclosure 10.

FIG. 9-B displays one embodiment of the Pet Enclosure 10 lid design, showing the underside of Top Rear Panel 24 with Stabilizers 21 attached, and Two-Way Clips 42 attached to the ends of Stabilizers 21.

FIG. 9-C displays a side view of FIG. 9-B with the addition of Piano Hinge 23 between Top Rear Panel 24 and Top Forward Panel 22 (shown in the open position and not attached to Stabilizer 21). Also shown are Two-Way Clips 42 attached to each end of Stabilizer 21, and Handle 44 attached to Top Forward Panel 24.

FIG. 9-D depicts FIG. 9-C as it sits atop Right Side Panel 18 (Left Side Panel 16 is not visible at this angle), and Front Door Panel 12, and Back Wall Panel 20. Also shown is the corner Ventilation System 11.

FIG. 10-A discloses an alternative embodiment of the Pet Enclosure 10 lid design. The flip side of newly connected Top Panels 24 and 22. U-Bar 29, shown magnified above the plan view, is depicted U-side up. U-bars 29 are glued, U-side up, onto the edges of Top Panels 24 and 22 as shown.

FIG. 10-B displays placement and gluing of U-Bars 17 to the center top edge of Left Side Panel 16 and Right Side Panel 18. The magnification of U-Bar 17 above the perspective view of Side Panels 16 and 18 shows U-Bar 17 with U-side down, being glued to a top edge of a side panel.

Figure 11:
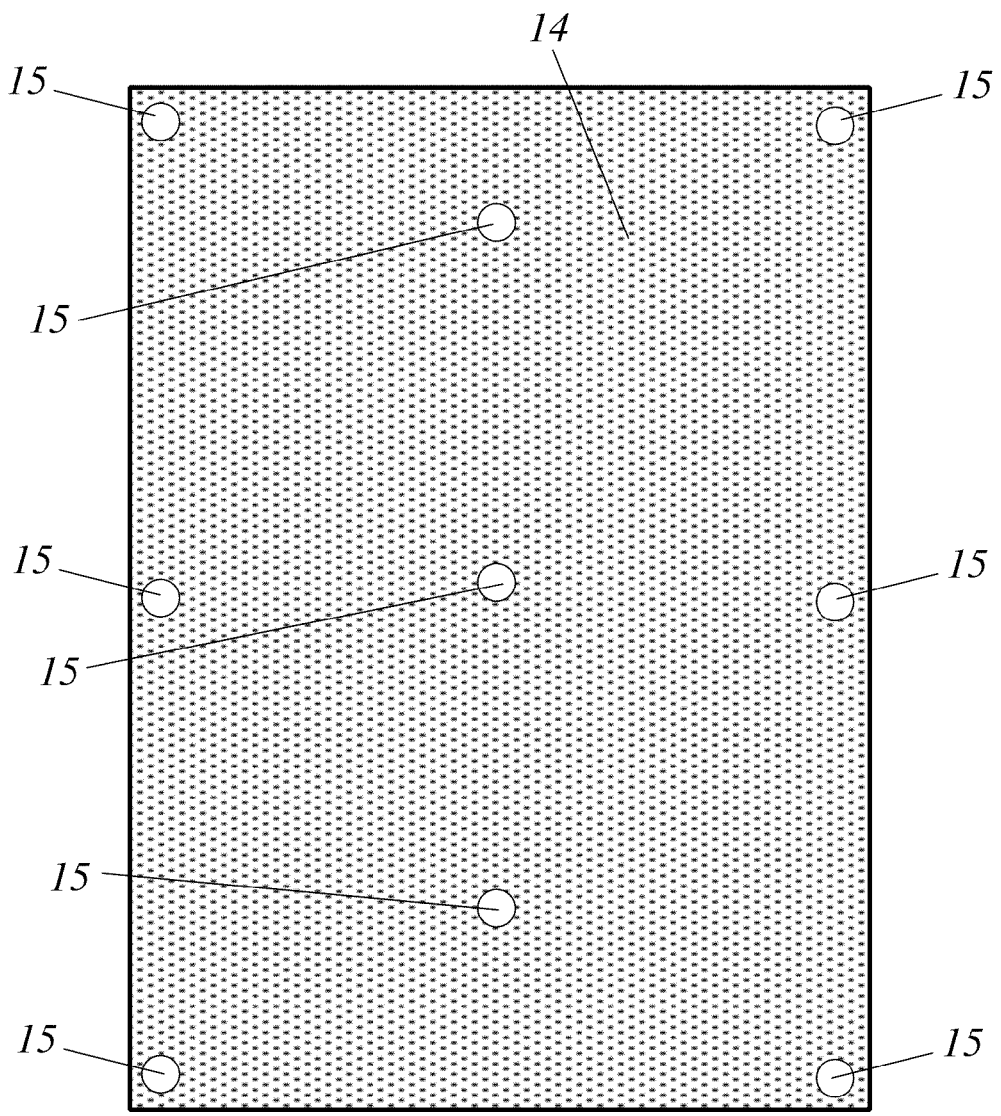
FIG. 11: A plan view of the underside of the Base Panel, showing the placement of the Floor Protectors.

FIG. 11 shows the placement of Floor Protectors 15, glued into place on the underside of Base Panel 14.

Figure 12:
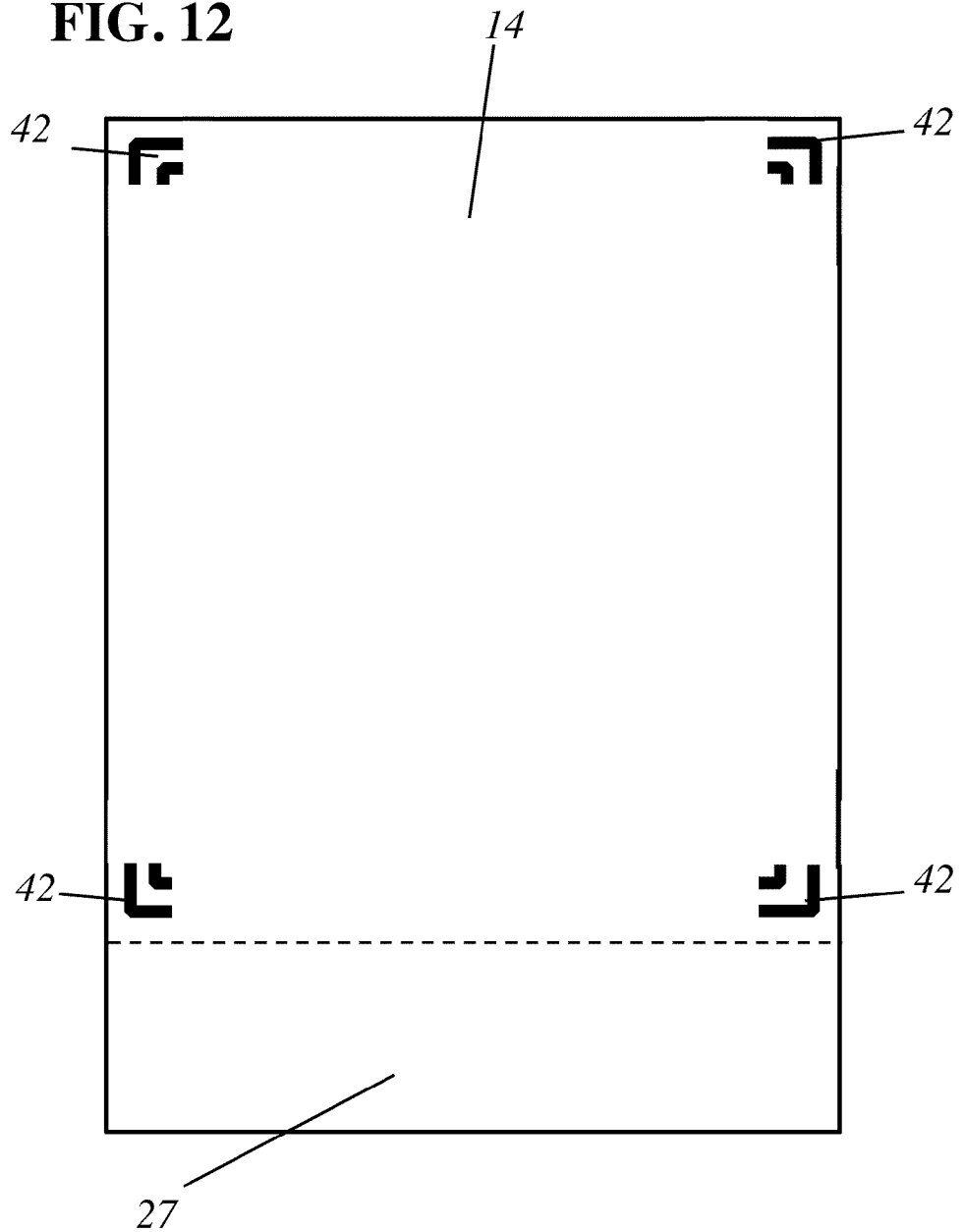
FIG. 12: A plan view of the topside of the Base Panel, showing the placement of the 2-way clips, and also indicating the area of the Porch, which is the front part of the Base Panel.

FIG. 12 depicts the 2-way Clips 42 glued on the topside of Base Panel 14, in the directions indicated, leaving space for, and creating Porch 27.

Figure 13:
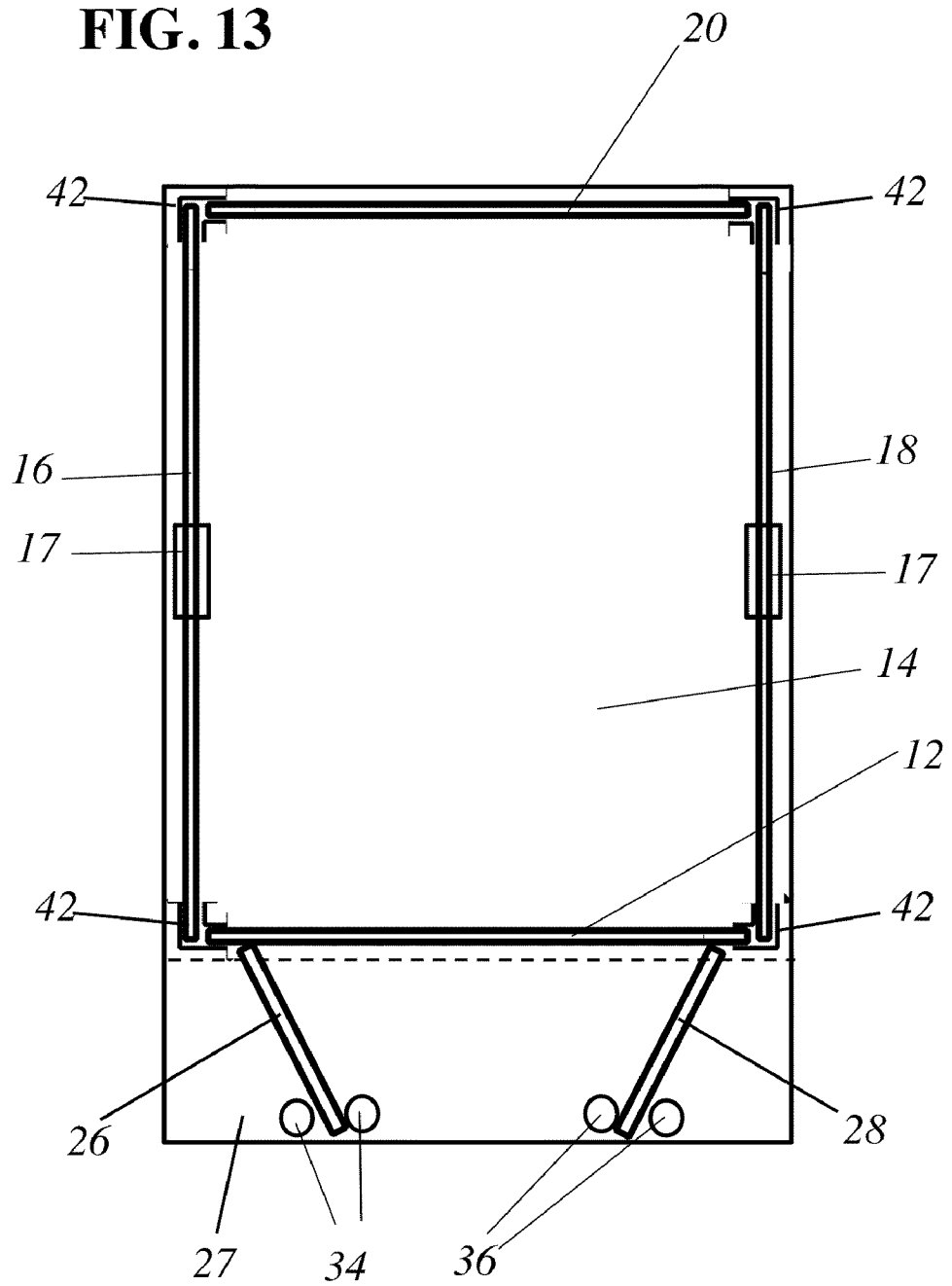
FIG. 13: A bird's eye plan view of the topside of the Base Panel, and of the top edges of both Side Walls, Back and Front Panels after their lower edges are slipped into the 2-way clips. The corners show the gaps between panels, which create the Ventilation system. The view also includes the top edges of the Barrier panels and how they appear on the Porch, and the placement of the Stoppers, which, in this embodiment, are 3M™ BUMPONS™ PROTECTIVE PRODUCTS, manufactured by 3M WORLDWIDE UNITED STATES, 3M Corporate Headquarters, 3M Center, St. Paul, Minn. 55144.

FIG. 13. The bottom corners of Side Wall Panels 16 and 18, and Back Wall Panel 20, and assembled Front Door Panel 12 slip into the slots of the 2-way Clips 42 that correspond with the locations of each of the panels depicted in FIG. 2. FIG. 13 Side Wall Panels 16 and 18 show the U-Bars 17 already glued as in FIG. 10-B. FIG. 13 Barrier Panels 26 and 28 swing out to form an angle necessary to allow one animal to enter or exit without another animal entering the enclosure. Once a working angle is selected, Left Porch Stoppers 34 and Right Porch Stoppers 36 are placed on each side of Barrier Panels 26 and 28 as shown.

FIG. 14. For the alternative lid embodiment Angle Iron Caps 46 slide onto the top four corners in the manner depicted in this example from Left Side Wall Panel 16 and Back Wall Panel 20. The magnification of one Angle Iron Cap 46 shows a perspective view of the Angle Iron Cap 46.

Figure 15:
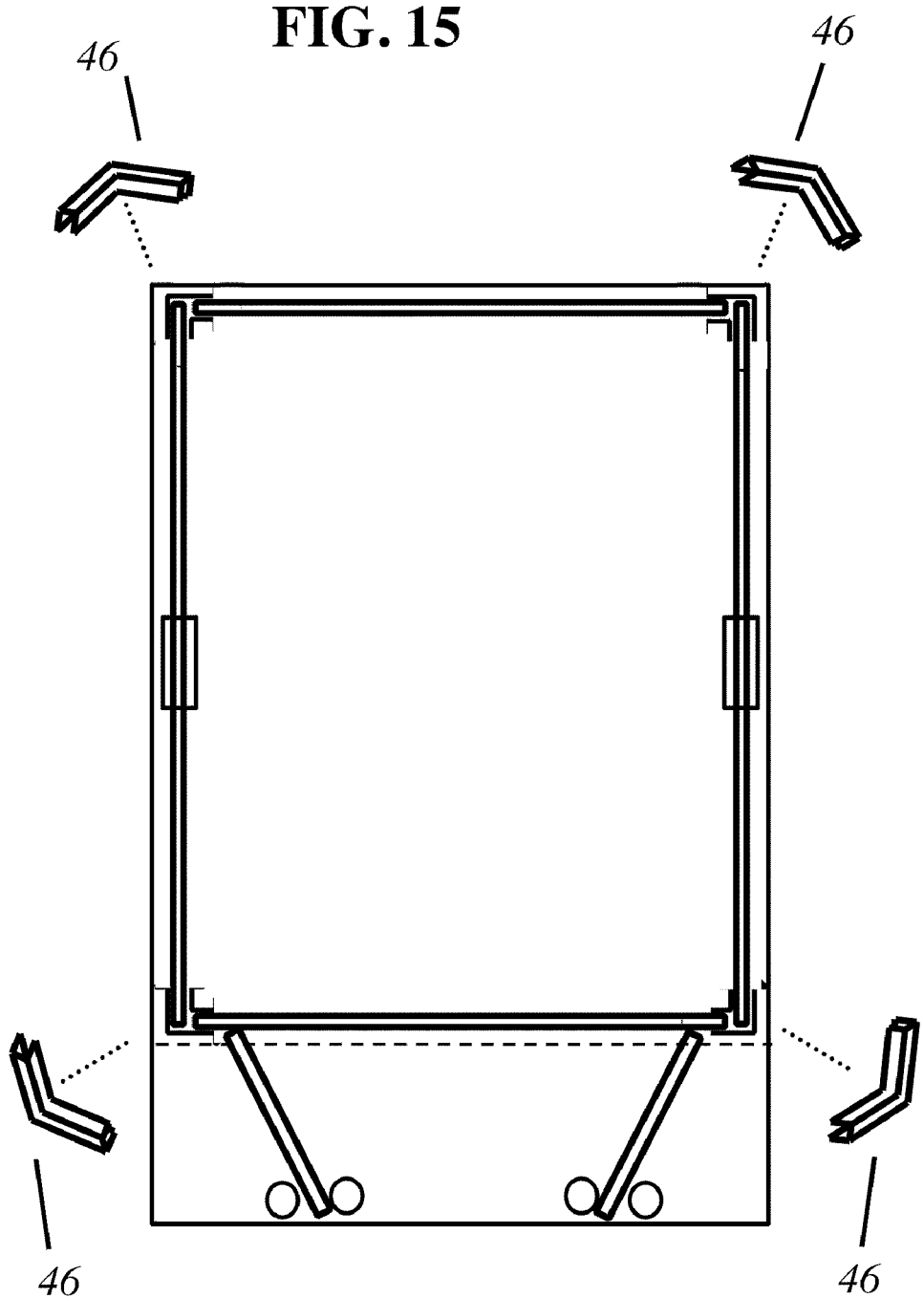
FIG. 15: A bird's eye plan view of the enclosure with all walls assembled, showing the Angle Iron Caps positioned to be attached.

FIG. 15 illustrates Angle Iron Caps 46 dropping into place on each corner, creating stability between panels, creating corner Ventilation System 11 gaps FIG. 4-A and FIG. 4-B, and acting as a base for the placement of Top Panels 22 and 24 FIG. 9.

Figure 16:
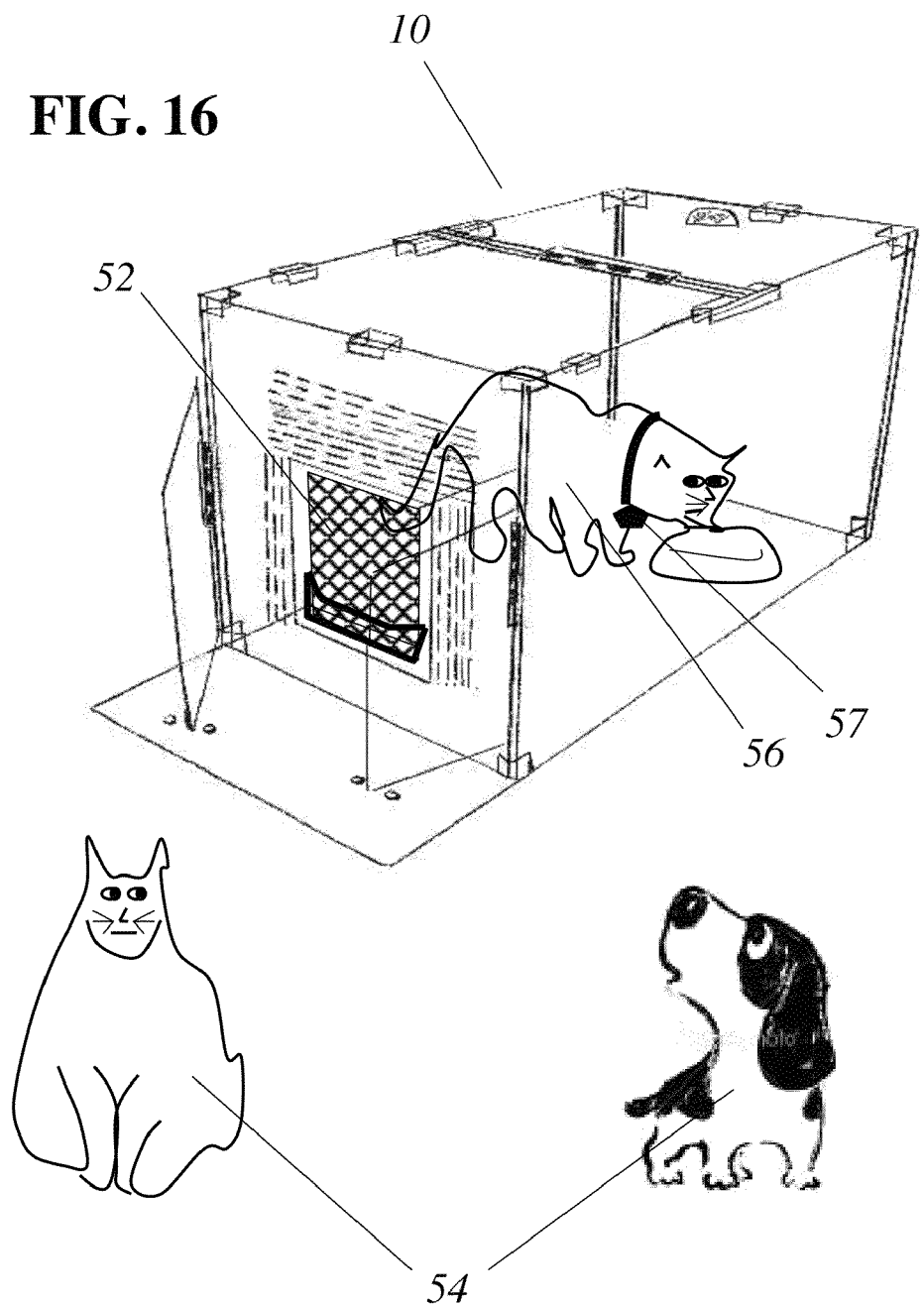
FIG. 16: A perspective view of the Pet Enclosure, with a selective access pet actuated pet door installed, showing a cat in the interior of the enclosure wearing a door activation device on its collar. Another cat, and a dog are outside the Pet Enclosure, each having no activation device to gain access to the interior.

FIG. 16 discloses a working model of Pet Enclosure 10, illustrating a Cat With Access Privileges 56 inside Pet Enclosure 10, wearing the Collar With Access Device 57 that opened the Pet Actuated Entry Door to let said cat inside. Also depicted is a Cat & Dog Without Access Devices 54 sitting outside the Pet Enclosure 10, wondering how to get inside.

Figure 17:
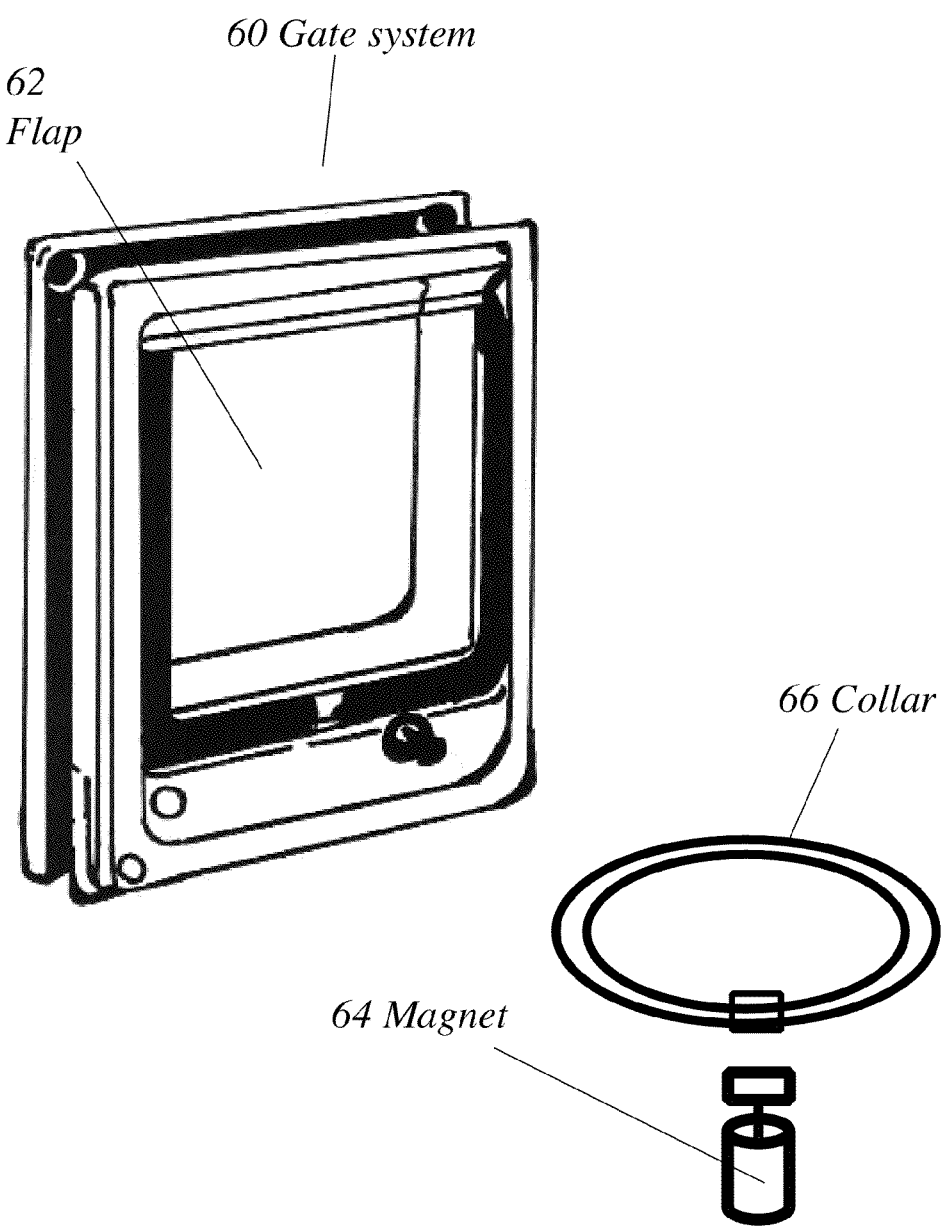
FIG. 17: A perspective view of the Pet-Tek Catwalk Multi-Magnetic Cat Door W-MCDW pet actuated entry system.

FIG. 17 discloses a preferred embodiment of a pet actuated selective access gate system 60 Catwalk Multi-Magnetic Cat Flap, product #W-MCDW, manufactured by Pet-Tek International LTD, P.O. Box 25759, St. Hellers Auckland, New Zealand 60. The overall size of the gate is 9⅝" tall by 7½" wide. The flap 62 is 6¾" tall by 6" wide. The unit 60 is made from Bayer high impact Polycarbonate and Lustran Plastics. The magnet 64 measures 1½" tall by ¾" wide. The collar 66 is a standard cat collar. The magnet 64 is attached to the collar 66 when in use.

Operation

In use, after assembling the parts, a user may employ the handle on the top of the enclosure to open the Top Back Panel, or they can remove the entire top, for the purposes of cleaning, changing food and water, scooping or changing cat litter, bedding, or any other reasons an end user deems appropriate to access the inside. Once the inside of the enclosure is set up the way the user intends, the entire top may be re-installed by placing the top panels in position over the side, back and front panels. Or, if only one side was raised to open the enclosure, the user can return the open portion to its closed position.

To adjust the left and right barriers, a user will swing the barriers to a desired position, and then use four stoppers, one on each side of each barrier, to keep them in place.

The gate of the present embodiment, the Catwalk Multi-Magnetic Cat Flap, is a four-way locking system that can be adjusted for In-Only, allowing a pet entry and preventing exit, Out-Only, allowing exit but preventing entry, Locked, preventing entry and exit, and In & Out, allowing both entry and exit.

To clean the enclosure, a user may choose to remove the top entirely, then clean the enclosure and replace the top. To do a thorough cleaning, a user may choose to remove the top, slide the panels out of the 2-way clips, clean, and replace them. In this rendition of the enclosure, the acrylic plastic panels are dishwasher safe.

The magnet is connected to the collar, the collar placed on the pet, and the pet is trained to approach the Cat Flap and push the flap open when the magnet releases the lock mechanism.

Alternative Embodiments

Alternative embodiments could include the sizes and composition of materials used, and colors applied. They may vary according to various intentions, needs or preferences. The enclosure could be constructed using, and is not limited to, materials such as acrylic plastic, wood or various metals, or other kinds of plastics, glass, or combinations thereof, using adhesives and hardware appropriate to the material selected. The enclosure can be large to accommodate larger animals, or sized to be accessed simultaneously by several pets. Alternatively, colors may vary, plastics, metal or wood can be smooth or textured, clear or opaque or frosted, or combinations there of.

The Top Back Panel opens using the piano hinge for cleaning or food changes. In the present embodiment, the intent is for only one side to open, with the other side acting as a support for the top; but it might be desirable for the Top Forward Panel to open as well. This can be done simply by adding a handle to the Top Forward Panel creating a dual opening enclosure. In yet another embodiment the top panel may be simply one top piece to open using a hinge on one side, or creating the top as a fitted removable lid without a hinge.

The barrier panels may include a top or bottom piece connecting them. The panels may be shaped, but not limited as, triangular, half-moon, curved, beveled, concave, or various combinations there of. In still another embodiment, they may be larger or smaller, longer or shorter, wider or thinner, and they may be secured into place using clips, stops, rails, glue, or any other devices that would keep them stationary. In yet another embodiment they may be left adjustable and free-moving. The panels may be applied to other animal entry systems to prevent neighboring pets and other unwanted animals from entering the home while an animal with access enters or exits the access door.

The paneling and ventilation system could be used with other enclosures, such as, but not limited to bird enclosures, which would prevent bird food, feathers, and feces from making a mess on the floor below the bird cage, and the paneling would prevent, for example, another animal from harming a pet bird. A further embodiment of the paneling and ventilation system could be an outside or covered patio where fresh air is desired, but inclement weather is objectionable.

Still another embodiment of the ventilation system may be holes or slits drilled into the panels of the enclosure, with each panel directly connected to another at the corners.

Other uses of the disclosed enclosure system could be, but is not limited to, pet rodent enclosures, pet rabbit enclosures, chicken and other livestock enclosures.

There can be variations in the kind of webbing designed on the Front Door Panel. The preferred embodiment uses a series of both horizontal and vertical short and long dashes, but could also be created with, but not limited to, X's and O's. The rough-in and webbing could be used for a plurality of egress/ingress options on still more assorted structures.

Another alternative embodiment could be created by using a special architectural design for the enclosure, for example but not limited to, building a cat tree and house together with a rough-in opening and barriers.

Another alternative could be a design of an enclosure for indoor or outdoor use. The preferred embodiment is designed for indoor pet control, but can easily be adapted for outside weather conditions by adding, as an example but not limited to, a roof-like structure, heating or cooling systems, windows, food and water devices, and special bedding. The base and side panels, front and back panels can be constructed without the side ventilation, or with a different design of ventilation.

Having described herein illustrative embodiments of the present disclosed enclosure, persons of ordinary skill in the art will appreciate various other features and advantages of the enclosure apart from those specifically described above. It should therefore be understood that the foregoing is only illustrative of the principles of the disclosed enclosure, and that various modifications and additions can be made by those skilled in the art without departing from the spirit and scope of the invention. Accordingly, the appended claims shall not be limited by the particular features that have been shown and described, but shall be construed also to cover any obvious modifications and equivalents thereof.

The invention claimed is:

1. An assembly for allowing pet access through a panel comprising:
    a front panel separating an external environment from an internal environment;
    a pivotal pet door positioned within the front panel and configured to allow the passage of a first pet through said pet door and front panel;
    first and second barriers, having proximal ends coupled to the front panel, flanking the sides of the pet door, and configured to be positioned at angles of less than 90 degrees with respect to the pet door, such that distal ends of the first and second barriers define a gap having a width that allows the first pet to pass through towards the pet door while excluding the simultaneous passage of a second pet, further comprising a main compartment of a pet enclosure having a plurality of sides and configured to spaciously house the entire body of the first pet, wherein the front panel is the front side of the main compartment and wherein said pet door is lockable and configured to be unlocked by actuating means coupled to the body of the first pet, wherein the plurality of sides of the main compartment substantially form a rectangular cuboid shape comprising a base panel configured to support the following detachable upright panels: the front panel, a left side panel, a right side panel, and a back panel, wherein the left and right side panels are each releasably coupled to both the front and back panels using fasteners, further comprising locking means to secure the first and second barriers in place once positioned at their desired angles, wherein the locking means comprise first and second stoppers having means for coupling to a flooring surface and are positioned on alternative sides of the first and second barriers.

2. The assembly of claim 1, wherein the flooring surface is a patio panel that is level with the base panel and extends away from the main compartment at a 90 degree angle, or substantially so, to the front panel.

3. The assembly of claim 1, further comprising a lid having a top front panel and a top back panel individually having facing sides coupled together by a hinge, wherein the lid is configured to releasably couple to the top surfaces of the upright panels, and wherein one of the top panels is configured to open and close to allow a user access into the main compartment.

4. The assembly of claim 3, wherein the lid's hinge does not traverse the entire lengths of the facing sides of the top front and top back panels, thereby creating at least one ventilation gap in the lid.

5. The assembly of claim 4, wherein the underside of the lid includes first and second support ribs that are configured to couple to the top surfaces of the left side panel and the right side panel of the main compartment, and wherein only one of the top lid panels is non-releasably secured to the support ribs, thereby allowing the other top lid panel to open and close.

6. The assembly of claim 3, wherein the front panel, the back panel, the right side panel, the left side panel, and the lid are constructed of a transparent plastic.

7. The assembly of claim 3, wherein the base panel, back panel, left side panel, right side panel, and the lid are planar, or substantially so, such that a user can readily stack these panels after disassembly from each other for easy storage.

* * * * *